June 9, 1931. A. E. ELSEA 1,808,771
AIRPLANE AUTOMATIC CONTROL
Filed Sept. 20, 1929  2 Sheets-Sheet 1
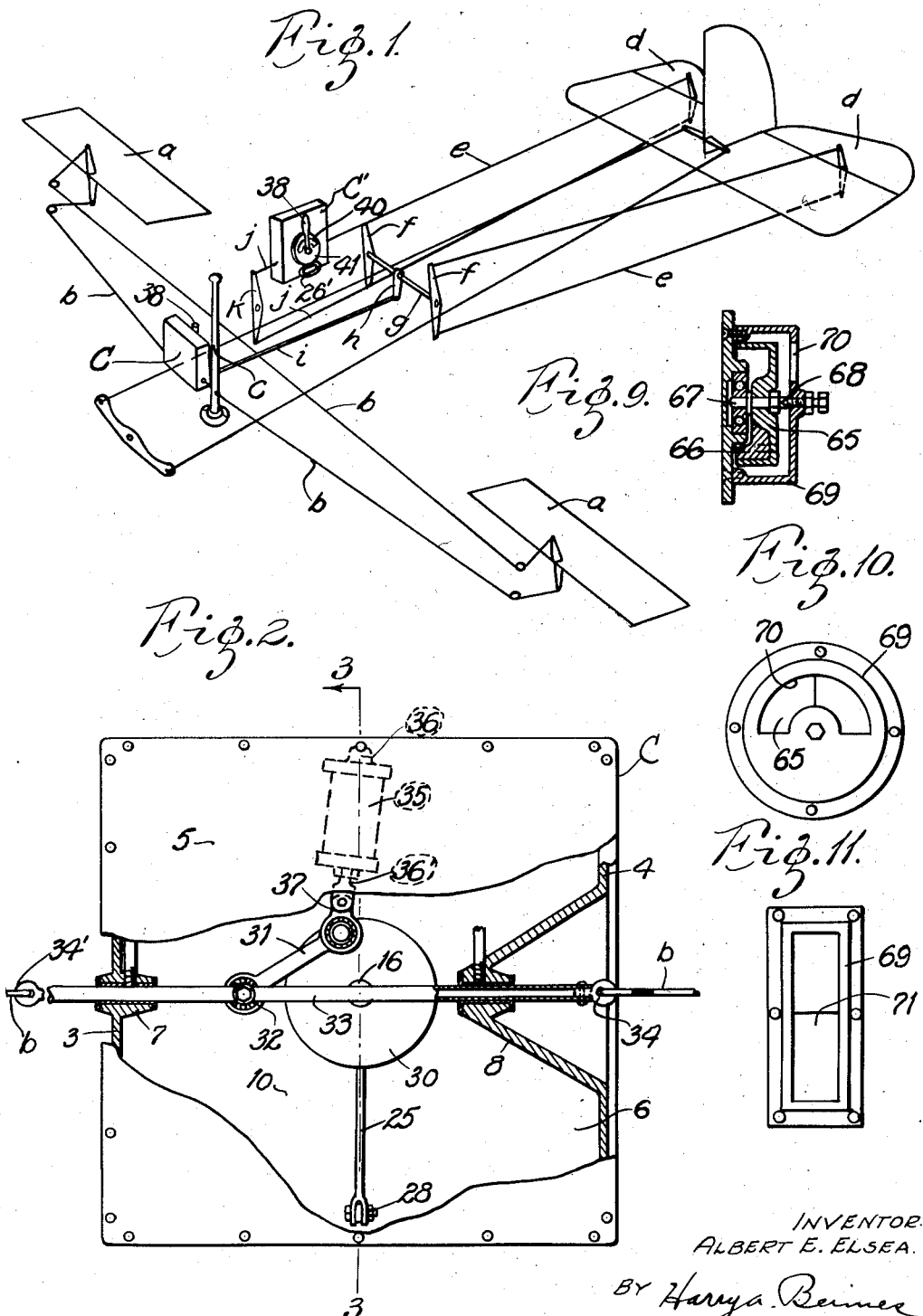
INVENTOR:
ALBERT E. ELSEA.
BY Harry A. Beiner
ATTORNEY.

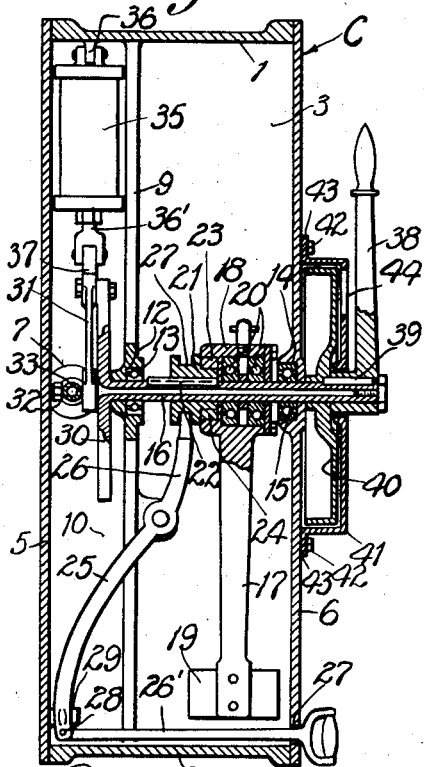
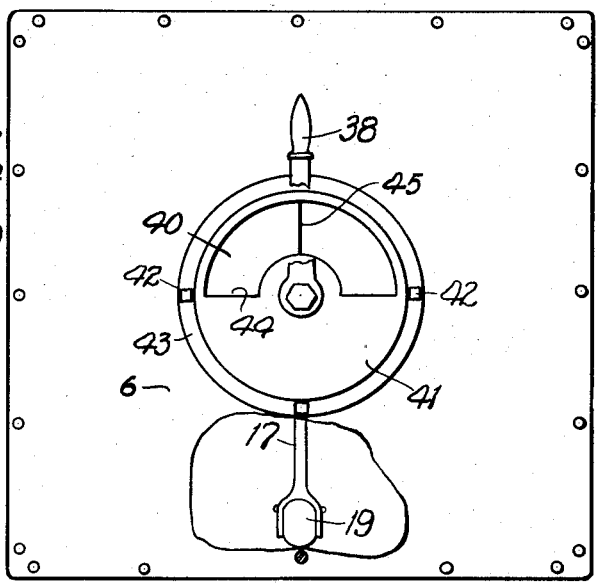
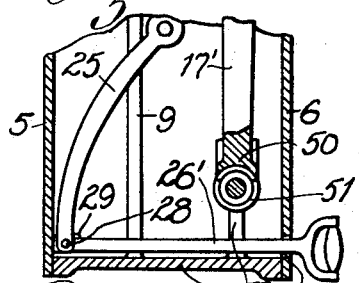
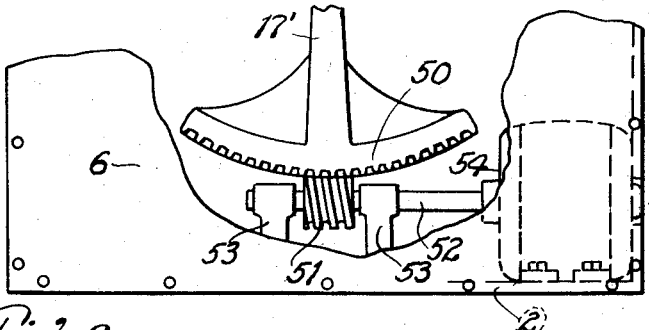
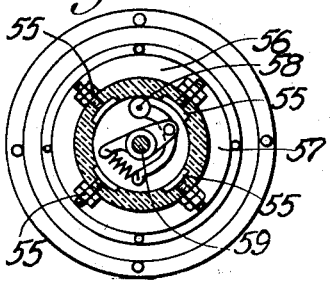
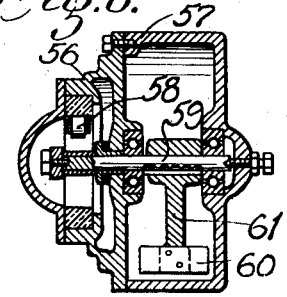

Patented June 9, 1931

1,808,771

UNITED STATES PATENT OFFICE

ALBERT E. ELSEA, OF EAST ST. LOUIS, ILLINOIS

AIRPLANE AUTOMATIC CONTROL

Application filed September 20, 1929. Serial No. 393,950.

My invention has relation to improvements in airplane automatic controls and consists in the novel features of construction more fully set forth in the specification and pointed out in the claim.

Briefly, the invention comprises a gravity or electric actuated mechanism that may be connected to the cables between the control stick and ailerons, and stick and elevator for automatically restoring the plane to even keel if tilted by adverse air currents on either its vertical or transverse axis. The control may replace the usual control stick or be operated in connection with it, and embodies an indicator for displaying the angle of bank or inclination.

The automatic control has for its principal object the righting of the plane without the aid of the manual controls, at the same time indicating the degree of departure from equilibrium. It is also an object of the invention to provide an automatic control that may be used as an accessory, without disturbing the standard controls. A further object of the invention is to provide a device capable of accomplishing the above objects with promptness and precision; and to provide a device that is simple and rugged. Further advantages will be better apparent from a detailed description of the invention in connection with the accompanying drawings, in which—

Figure 1 is a diagrammatic view of the ailerons and elevator, or flap, of an airplane together with their connections, and my improved automatic control associated therewith; Fig. 2 is a rear elevation of the control with parts of the housing broken away; Fig. 3 is a vertical cross-section taken on the line 3—3 of Fig. 2; Fig. 4 is a front elevation of the control with part of the housing broken away; Fig. 5 is a fragmentary section of a modified form of the invention adapted for actuation by an electric motor; Fig. 6 is a fragmentary view looking at right angles to Fig. 5; Figs. 7 and 8 are vertical sections, taken at right angles to each other, of a control switch associated with the modified control shown in Figs. 5 and 6; Figs. 9 and 10 are vertical section and front elevation of a modification in which the device is used only as a bank indicator; and Fig. 11 is a similar modification showing the device used as an inclinometer.

Referring to the drawings, and for the present to Fig. 1, $a$, $a$ represent the ailerons of an airplane connected in the usual manner by cables $b$, $b$ to the control stick $c$. My improved automatic control C may be connected to the cables $b$, $b$ in place of the stick $c$, or into one of the cables adjacent to said stick as shown. The elevator flaps $d$, $d$ are actuated by cables $e$, $e$ connected to rock-levers $f$, $f$ mounted on shaft $g$ which has connection with the stick $c$ through the lever $h$ and connecting rod $i$. A second automatic control C' may be connected to one of the levers $f$ by short cables $j$, $j$ and an anchor lever $k$. The manner of connecting the controls C, C' is immaterial and I make no claim to the specific connections herein shown. It is also of no consequenece whether the usual control stick $c$ is retained, my improved control being used as an auxiliary thereto, or replaced by my automatic control. The essential thing in the present invention is the automatic control and its indicator now about to be described.

Referring to Figs. 2, 3, and 4 of the drawings, the invention comprises a casing having a top wall 1, a bottom wall 2, end walls 3 and 4, a rear cover plate 5, and a front cover plate 6. End walls 3 and 4, have bearings 7 and 8 formed in them respectively and a supporting spider 9 is provided in the casing in spaced relation with rear wall 5 so as to divide the casing into compartments 10 and 11. A recess 12 is provided at the center of spider 9 to receive a ball-bearing 13 and a recess 14 is formed at the center of cover plate 6 to receive a ball-bearing 15, in which bearings is mounted a shaft 16. A pendant lever 17 having a hub 18 at one end and a weight 19 at the outer, free end is freely mounted on the shaft 16 by means of the ball-bearings 20, and said lever is adapted to be coupled to the shaft 16 through a clutch 21 slidingly mounted on shaft 16 through a spline 22. A toothed annular recess 23 is formed in the hub 18 for engagement with the toothed extension 24 on the clutch 21 and a shift lever 25 has connection at its upper bifurcated end 26 with an annular groove 27 formed in the clutch 21, whereby the latter may be put into and out of engagement with the hub 18 of lever 17. A shift bar 26' traverses an opening 27 in cover plate 6 and has its inner end connected at 28 to the extremity of shift lever 25 for actuating the shift lever, and a spring clamp 29 projects from the inside of rear plate 5 for the purpose of engaging the lever 25 and holding it when it has been moved to bring the clutch 21 and hub 18 into engagement. A disk 30 is fixed on the end of shaft 16 that projects into the compartment 10 and has one end of a connecting rod 31 pivotally connected near its periphery. The front end of said connecting rod being pivotally connected to an eye 32 formed in a bar 33 slidingly mounted in bearings 7 and 8. The ends of bar 33 may be connected by clevises 34, 34' to cables $b$, $b$ which operate the ailerons $a$, $a$. A dash-pot 35 is pivotally connected at its outer end to a lug 36 projecting from top wall 1 of casing C, the plunger 36' of the pot being connected to connecting rod 31 and disk 30 by means of a link 37. Of course, the dash-pot may be either hydraulic or pneumatic and of any standard type. A control handle 38 is fixed by means of a key 39 to the forward end of shaft 16 said key also serving to secure an indicator wheel 40 in slightly spaced relation with the handle 38, and a casing or cover 41 for the wheel is secured to cover plate 6 by means of screws 42 transversing a flange 43. The indicator wheel cover 41 has an arcuate window 44 extending over an angle of slightly more than 180° through which the indicator wheel may be observed, and any desired graduations may be placed upon the indicator wheel to show the pilot the amount of bank that is being made by the plane to either the left or right. Such markings would be readable with references to a center line 45 on the window 44. In order that the dial readings may be useful in the event that the plane should assume an inverted position, that half of the dial that is normally the lower half could be of a different color from the half that is normally the upper half.

Obviously, the markings may be placed upon the cylindrical surface of the indicator wheel and the window through which such markings are readable would be on the corresponding surface of the casing as shown in Fig. 11, which will be more specifically referred to hereinafter.

From the foregoing description the operation of the device is obvious. When the plane is tilted or banked laterally, not by the will of the operator but by adverse air currents, the lever arm under the influence of weight 19 will maintain its verticality while the casing C will move with the plane; therefore rotation will be imparted to the disk 30 and the bar 33 reciprocated so as to pull on the cables $b$, $b$ in a direction that will tilt the ailerons to a position to oppose the tilting of the plane and right the same automatically. A similar action takes place through the automatic control connected to the cables that operate the elevator flaps if the plane is suddenly nosed either upward or downward.

The device may be used in the manual control of the plane through the control handle 38, the oscillation of which will rotate disk 30 and reciprocate bar 33 to actuate the ailerons or elevator flap as the case may be. Of course, when the control handle 38 is used for the manual control of the plane the lever arm 17 is preferably disconnected by pulling the shift bar 26' and thus releasing hub 18 from the clutch 21.

In Figs. 5 to 8 inclusive, I show a modification of the invention in which electrical means are substituted for the gravity operated weight 19 for actuating the device. The lever arm 17' has a toothed segment 50 formed on the outer end for engagement with a worm 51 mounted on a motor shaft 52 supported in bearings 53, 53 together with the bearings of motor 54. The motor is electrically connected to stationary contacts 55, 55, 55, 55 fixed in the contact case 56 of a housing 57, and to a rotary contact 58 mounted on one end of a shaft 59 having suitable bearings in the housing 57. A weight 60 is suspended from a lever arm 61 connected to a shaft 59 within housing 57, and with a relative movement between the weight and the housing, the movable contact 58 will ride over the inner cylindrical surface of contact case 56. Thus when the housing 57 is mounted in an airplane and the latter is banked the roller contact 58 will rotate, and if the movement is sufficient to either side, it will engage one of the contacts 55 and close the electrical circuit through the motor 54 putting the motor into operation and oscillating the lever 17' to actuate the ailerons for the purpose of righting the plane. The construction of the control switch for the motor 54 is not arbitrary and in the present instance is similar to that of an electric distributor in the ignition system of internal combustion engines. The essential feature of such a control switch is the relatively fixed and rotatable contacts, the latter being actuated by the gravity lever 61.

In Figs. 9 and 10 I show the principle of the invention applied to a bank indicator without the automatic control feature. In this modification the indicator wheel 65 has a weight 66 built into it at one point, and is freely rotatable on bearings 67, 68 in a cylindrical casing 69. The casing 69 is provided with an arcuate window 70 through which the graduations on the wheel 65 may be read. In Fig. 11 I show an indicator similar to that shown in Figs. 9 and 10 except that the window 71 is provided on the cylindrical wall of casing 69 instead of the front flat wall, thereby adapting the device to be used more advantageously as an indicator for the angle of climb and descent.

While my improved control is primarily adapted to airplanes it may be used to similar advantage on dirigibles especially to prevent automatically the ship from nosing upward or downward under the influence of rising and falling air currents. When the device is used on dirigibles it will be connected to the elevator controls in a manner similar to that employed on airplanes.

Having described my invention, I claim:

An aircraft control comprising a casing adapted to be fixed in the aircraft, a shaft mounted in said casing, a pendant lever loosely mounted on said shaft, means for coupling the lever to the shaft, an indicator fixed to the shaft, said indicator being readable in connection with suitable markings on the casing, a manually operable lever fixed to said shaft, and connecting mechanism operable by said shaft and adapted to be connected to the aircraft stabilizing devices.

In testimony whereof I hereunto affix my signature.

ALBERT E. ELSEA.